United States Patent
Kirchner et al.

(10) Patent No.: US 12,201,124 B2
(45) Date of Patent: Jan. 21, 2025

(54) METHOD FOR OBTAINING PRODUCTS FOR THE FOOD INDUSTRY AND/OR FEED INDUSTRY FROM INSECTS, AND SOLID PHASE OBTAINED FROM INSECTS

(71) Applicant: GEA MECHANICAL EQUIPMENT GMBH, Oelde (DE)

(72) Inventors: Stefan Kirchner, Gütersloh (DE); Dirk Sindermann, Oelde (DE); Jörg Heidhues, Bad Sassendorf (DE)

(73) Assignee: GEA Mechanical Equipment GmbH, Oelde (DE)

( * ) Notice: Subject to any disclaimer, the term of this patent is extended or adjusted under 35 U.S.C. 154(b) by 785 days.

(21) Appl. No.: 17/259,094

(22) PCT Filed: Jul. 11, 2019

(86) PCT No.: PCT/EP2019/068640
§ 371 (c)(1),
(2) Date: Jan. 8, 2021

(87) PCT Pub. No.: WO2020/011903
PCT Pub. Date: Jan. 16, 2020

(65) Prior Publication Data
US 2021/0315234 A1 Oct. 14, 2021

(30) Foreign Application Priority Data
Jul. 11, 2018 (DE) .................. 10 2018 116 769.5

(51) Int. Cl.
*A23J 1/00* (2006.01)
*A23D 9/007* (2006.01)
(Continued)

(52) U.S. Cl.
CPC ............... *A23J 1/00* (2013.01); *A23D 9/007* (2013.01); *A23D 9/02* (2013.01); *A23J 3/04* (2013.01); *A23K 10/20* (2016.05)

(58) Field of Classification Search
CPC .... A23K 10/20; A23J 1/00; A23J 3/04; A23D 9/02
See application file for complete search history.

(56) References Cited

U.S. PATENT DOCUMENTS

2015/0132433 A1* 5/2015 Dossey .................. A23L 35/00
426/455

FOREIGN PATENT DOCUMENTS

WO 2013191548 A1 12/2013
WO 2014123420 A1 8/2014
(Continued)

OTHER PUBLICATIONS

Bukkens, "The Nutritional Value of Edible Insects," Ecology of Food and Nutrition, Jan. 1997, pp. 287-319, vol. 36, No. 2-4.
(Continued)

*Primary Examiner* — Donald R Spamer
*Assistant Examiner* — Assaf Zilbering
(74) *Attorney, Agent, or Firm* — PATENT PORTFOLIO BUILDERS PLLC

(57) ABSTRACT

A method for obtaining products for the food industry and/or feed industry from insects at the larval stage involves: a) comminuting the insects to form an insect pulp; b) shifting the pH-value of the insect pulp to an acid range by adding an acid and malaxing the insect pulp for a period of at least 45 minutes; and c) fractioning the insect pulp using centrifugal treatment into at least two fractions i) a solid fraction, ii) a fatty phase; and a fat-reduced solid phase.

19 Claims, 6 Drawing Sheets

Figure 1:
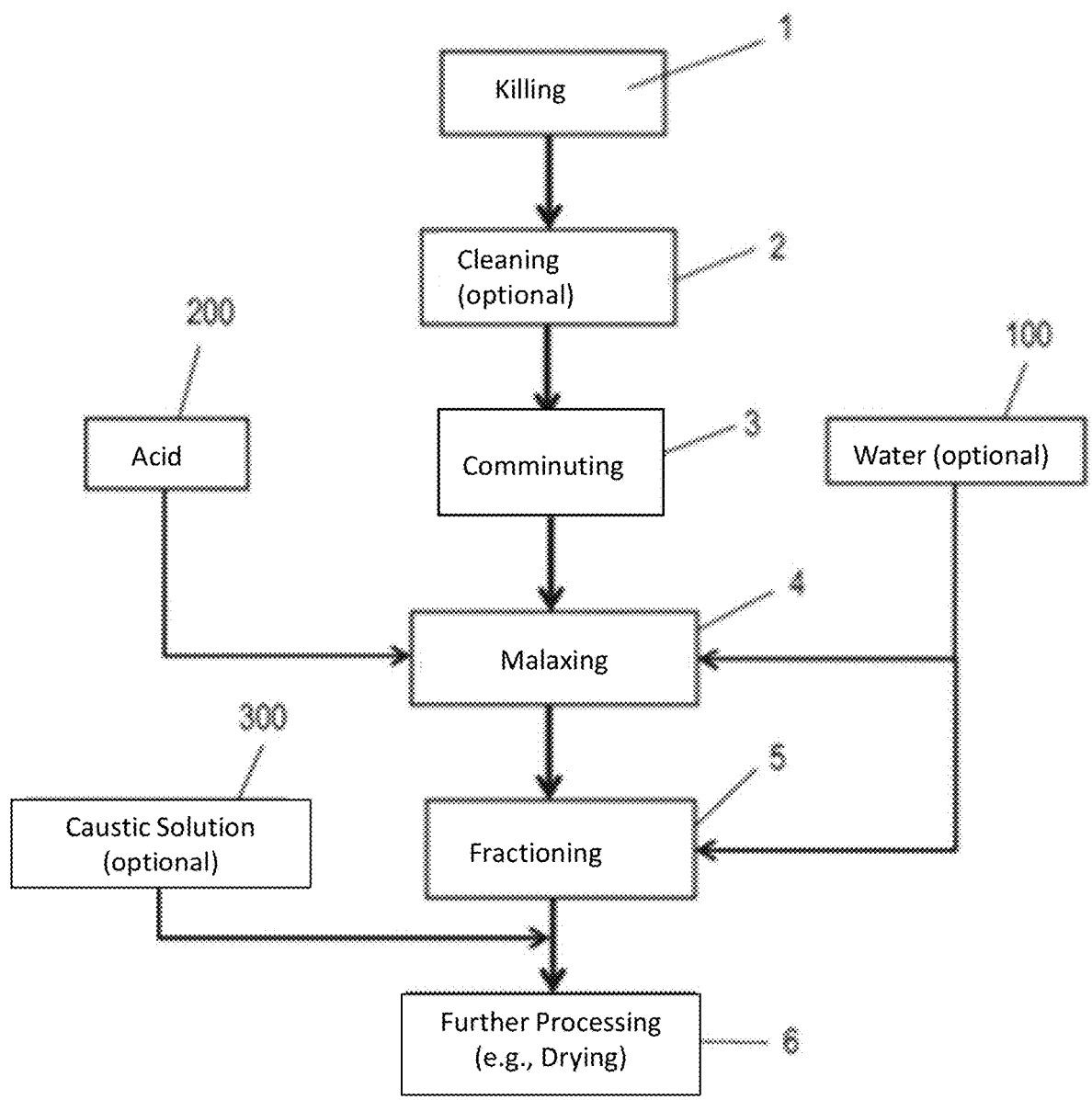

(51) Int. Cl.
    *A23D 9/02*     (2006.01)
    *A23J 3/04*     (2006.01)
    *A23K 10/20*     (2016.01)

(56) References Cited

FOREIGN PATENT DOCUMENTS

| WO | 2015070194 A1 | 5/2015 |
|---|---|---|
| WO | 2017066880 A1 | 4/2017 |
| WO | 2018122294 A1 | 7/2018 |

OTHER PUBLICATIONS

International Search Report mailed Oct. 10, 2019 in related/corresponding International Application No. PCT/EP2019/068640.
Khan, "Recent advances in role of insects as alternative protein source in poultry nutrition," Journal of Applied Animal Research, May 14, 2018, pp. 1144-1157, vol. 46, No. 1.
Search Report created on Feb. 26, 2019 in related/corresponding DE Application No. 10 2018 116 769.5.
Written Opinion mailed Oct. 10, 2019 in related/corresponding International Application No. PCT/EP2019/068640.
Zhao et al., "Yellow Mealworm Protein for Food Purposes—Extraction and Functional Properties," Plos One, Feb. 3, 2016, vol. 11, No. 2.

\* cited by examiner

Fig. 5

|         | Retention Time |        |        |         |
|---------|----------------|--------|--------|---------|
|         | 30 min         | 60 min | 90 min | 120 min |
| pH 6,86 | 19,4           | 19,7   | 16,3   | 15,8    |
| pH 2,9  | 17,4           | 15,7   | 14,3   | 14,0    |

METHOD FOR OBTAINING PRODUCTS FOR THE FOOD INDUSTRY AND/OR FEED INDUSTRY FROM INSECTS, AND SOLID PHASE OBTAINED FROM INSECTS

BACKGROUND AND SUMMARY OF THE INVENTION

Exemplary embodiments of the present invention relate to a process for obtaining products of the food and/or feed industry from insects.

Furthermore, exemplary embodiments of the present invention relate to a low-fat and thus particularly protein-rich solid phase obtained from insects. The fat phase may also be referred to as the oil phase or oil fraction.

Fractionation of the pulp from insect larvae is currently carried out in isolated cases on an industrial scale. The few companies that produce today partly use a process with the addition of water for this purpose. Alternatively, presses are also used, whereby the fat can be pressed off the solids together with the water. If larvae of the insects are dried beforehand, the oil can be pressed off the solids.

In contrast to the use of presses, the aqueous process allows a solid to be obtained that has a high protein content and a lower residual fat content. The solid can be used as animal feed or for use as food. Low residual fat values are advantageous for further processing, packaging and storage.

WO 2013/191548 A1, in the field of fractionation of insects, describes a process involving a comminution of insects and worms to a pulp, in particular to a particle size of 1 mm. This is followed by enzymatic hydrolysis at 35-65° C. with acidic protease at pH 3-6 or a neutral protease at pH 6-8.

The pulp is then heated to temperatures of 70-100° C. and finally separated into three phases to form an oil fraction, an aqueous protein fraction, and a solids-containing fraction. The fractions can then be dried.

Furthermore, WO 2014/123420 A1 discloses a fractioning process involving the following process sequence. A comminution of the insects and/or worms, in particular also of insect larvae, to a pulp, whereby the comminution takes place to a mean particle size of less than 1 mm. The insect pulp is then heated to 70-100° C. Finally, the process comprises separation into three phases, an oil fraction, an aqueous protein fraction, and a solids-containing fraction. The process is enzyme-free and includes drying of individual products. Killing of insects or worms is not disclosed in this publication. When worms and insects are processed by the method described in this publication, it has been found that a brown discoloration of the insect pulp occurs within a very short time after comminution. This effect is also described below as the "browning effect". This effect influences the feed quality and customer acceptance of the product.

WO 2018/122294 A1 discloses a method for processing a biomass with simultaneous recovery of proteins and lipids from insects. The embodiments involve killing the insects by freeze-drying. In this regard, a strategy for processing the biomass is followed, which comprises a separation into a fat phase and a water phase. The water phase may include, but is not limited to, insoluble components (solids). A separate solid phase is not separated.

It has been shown that the processes described above are either comparatively expensive and labor-intensive or only allow insufficient degreasing of the solid fraction, which prevents good further processing.

Therefore, exemplary embodiments of the present invention are directed to further optimization of the processing of insect pulp.

A process according to the invention is used for obtaining products of the food and/or feed industry from insects, in particular insects in the larval stage. It is characterized by the following steps:
 a) Crushing of the insects with the formation of an insect pulp
 b) shifting the pH of the insect pulp to an acidic range by adding an acid and malaxing the insect pulp for a period of at least 45 minutes; and
 c) Fractionation of the insect pulp into at least two fractions
  i. a solid fraction,
  ii. one fat phase The fat phase can also be described as the oil fraction. The solid fraction can be proteinaceous. Alternatively, an additional third aqueous protein fraction can be recovered, which can subsequently be dried, e.g., by an evaporator, so that the recovered water is recyclable in the process and that the recovered protein represents a separate valuable phase.

The protein-containing solid fraction can be used as animal feed.

Preferably, the solid fraction can still be ground and/or dried in further process steps.

The prior separation of fat or oil is of particular importance in this respect, since otherwise the further comminution in the subsequent process steps is not possible or only possible with great difficulty. Smearing occurs, which makes processing in a feed mill, for example, almost impossible.

Furthermore, the low fat content also permits the addition of one or more foreign fats and/or oils, i.e., fats and/or oils that are not contained in the insects originally used, which increases the formulation variance. For example, essential oils and/or fats can be added.

The products of the food and/or feed industry include animal feed but also sports nutrition.

The oil fraction or fat fraction can be used as a separate recyclable phase, preferably as fuel and/or animal feed.

As has been surprisingly shown on the basis of tests, the combination of malaxation, in particular mixing and/or kneading, over the minimum period described above with the additional addition of acid enables a much better separation efficiency of fat or oil from the solid (more than 20% higher) than with the procedure of WO 2014/123420 A1.

In particular, the process according to the invention can be carried out without the additional supply of enzymes, which makes the process particularly economical by omitting the usually expensive enzymes and also particularly efficient, since enzyme separation and/or recovery becomes unnecessary.

Fractionation of the insect pulp into three phases can be carried out in a single-stage or multi-stage process. Single-stage fractionation can be carried out, for example, in a 3-phase decanter. Multi-stage fractionation can be carried out in such a way that two centrifugal separation steps take place in succession, whereby both decanters and separators can be used for the separation steps.

The solid fraction can then be subjected to drying.

The acid addition can advantageously take place within less than 10 minutes, particularly preferably within less than 5 minutes, after comminution, so that side reactions or rearrangements, such as protein folding and/or oxidative effects, are advantageously avoided prior to acid addition.

The pH of the insect pulp after the addition of the acid less than pH=6.5 can preferably be in the range of pH=2 to pH=4.5, particularly preferably between pH=2 to pH=3. Particularly effective separation of the oil phase was observed in these pH ranges.

The temperature during malaxation and/or fractionation can be at least 60° C., preferably 80-100° C., in particular 85-95° C. At this temperature, particularly good centrifugal separation of the oil phase is achieved.

Malaxation can advantageously take place over a period of at least 55 minutes, preferably 60-130 minutes, more preferably 90-120 minutes.

The fat phase obtained by fractionation can be processed by fat polishing, e.g., by using a separator, to obtain an oil phase with particularly high purity.

The average particle size of the insect parts in the insect pulp after comminution can advantageously be smaller than 2 mm, in particular between 1 to 2 mm.

The acid may advantageously be a dilute hydrochloric acid, preferably a hydrochloric acid with a concentration of 0.001 mol/l to 0.5 mol/l. Chlorides are predominantly readily soluble in water, so that certain salts can be separated from the solid with the water phase.

After fractionation, the fraction can advantageously be neutralized by adding a base, in particular by adding a dilute NaOH solution, for better compatibility of the solid phase when it is used as food or feed.

Insects can be killed before crushing for better process control.

After killing the insects and before crushing the insects, cleaning of the insects can take place. This can preferably be done by washing, in particular by surface washing.

Advantageously for the adjustment of viscosity for transfer and separation efficiency, water can be added during malaxation and/or fractionation.

Fractionation can take place in at least one decanter, in particular in a 3-phase decanter, a 2-phase decanter and a separator, and/or a 2-phase decanter.

Further according to the invention is a solid phase obtained from insects with a residual oil content of less than 15% by weight, in particular obtained by the process according to the invention. The solid phase is obtained from insects and therefore, unlike plants, contains chitin.

The protein content of the solid phase is comparatively high. It is more than 50 wt. %, preferably more than 90 wt. %, particularly preferably more than 95 wt. %.

Unlike other animal protein sources such as pork, beef or chicken, the solid phase can be produced free of antibiotics and it has a very favorable $CO_2$ balance due to processing and breeding.

Several variants of the process according to the invention are explained in detail below with the aid of the accompanying figures. Individual details described below can also be taken separately from the specific example as separate features.

BRIEF DESCRIPTION OF THE DRAWING FIGURES

Figure 2:
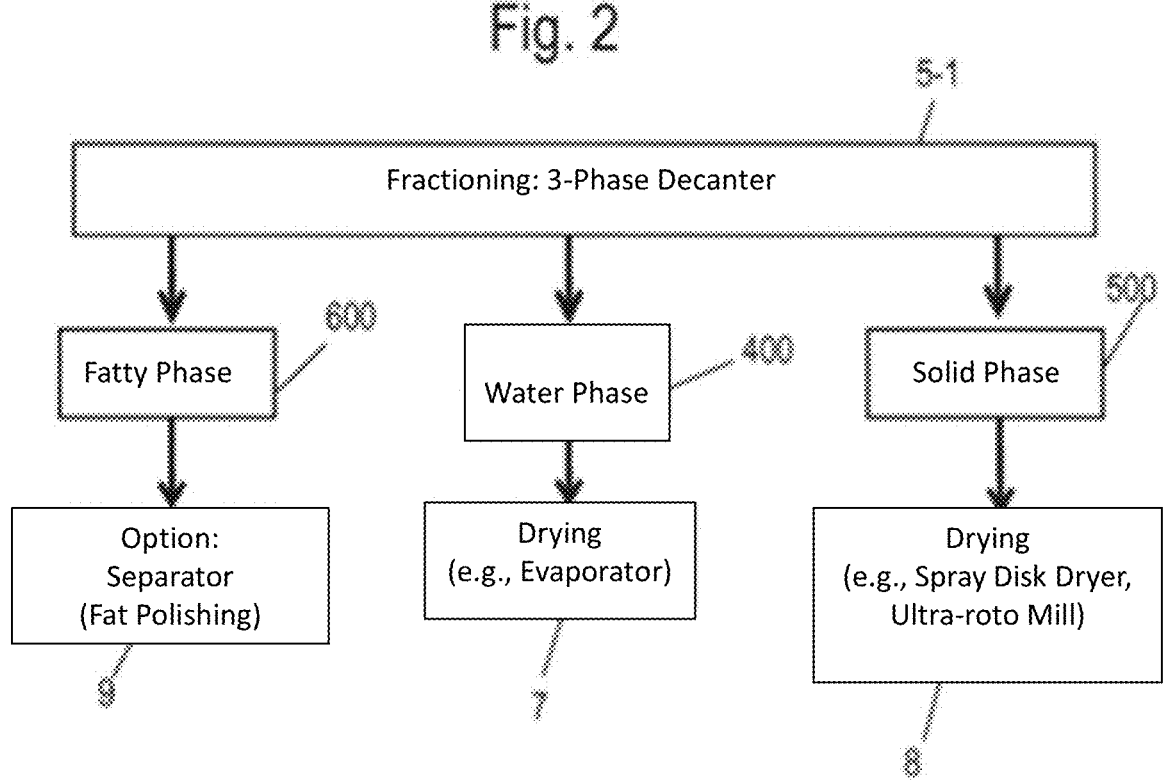
Figure 3:
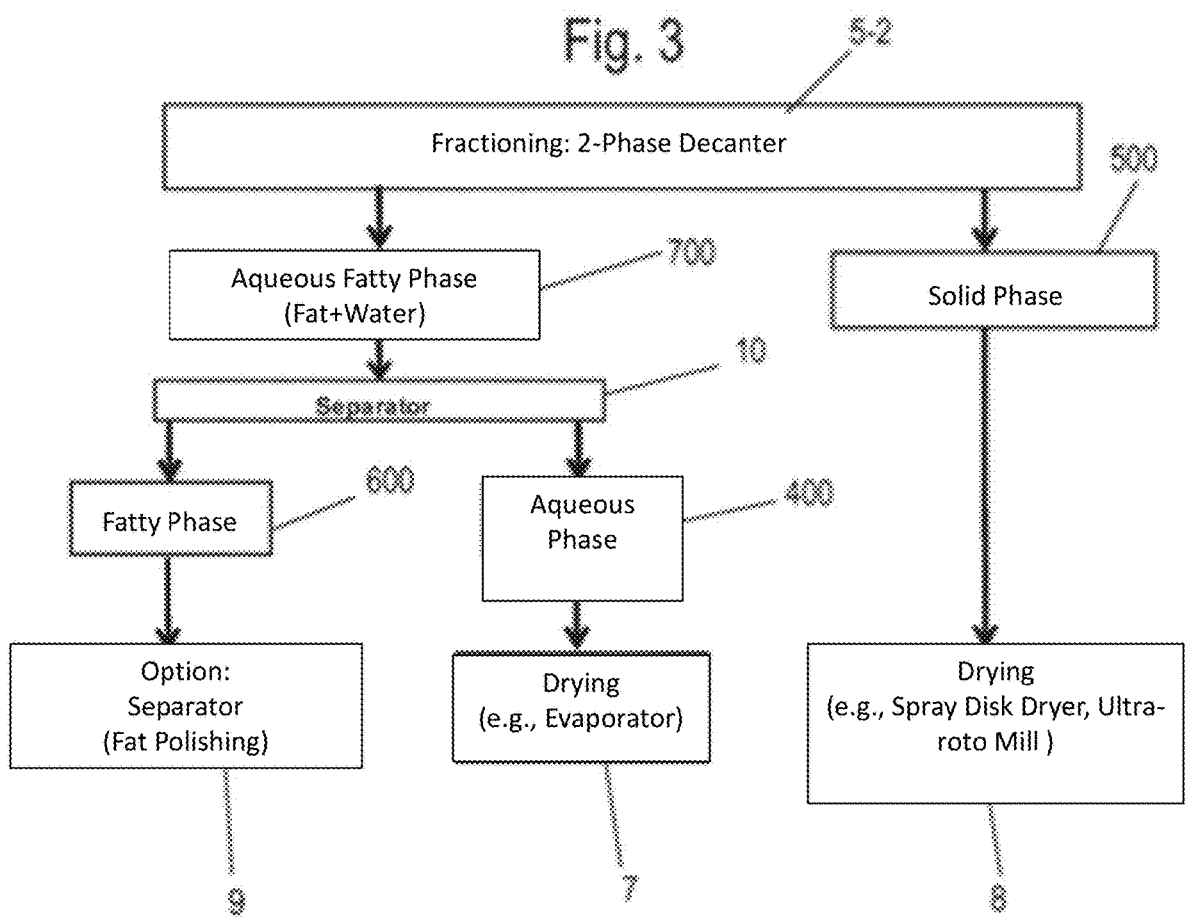
Figure 4:
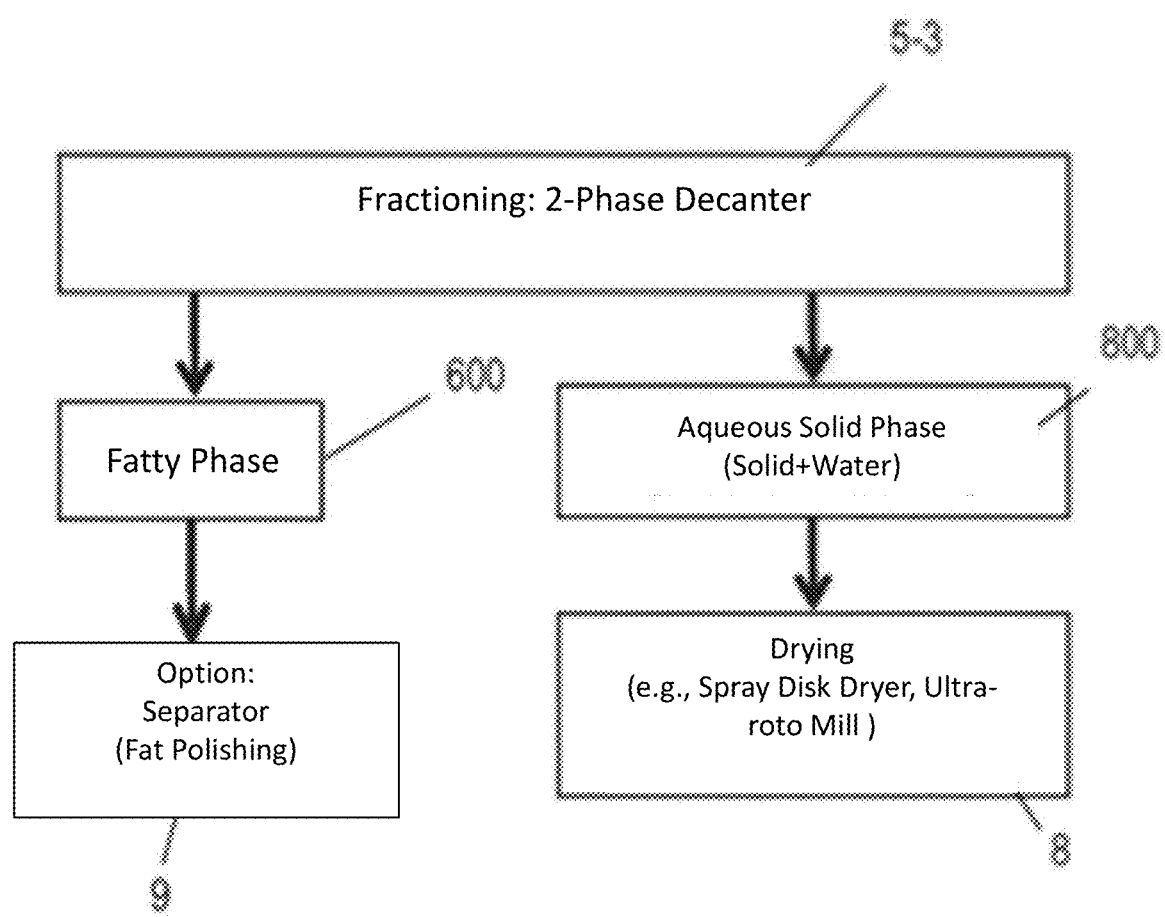

It Show:

FIG. 1 basic process diagram of an embodiment of the process according to the invention;

FIG. 2 Process details of a first variant of a fractionation within the scope of the process according to the invention;

FIG. 3 Process details of a second variant of a fractionation within the scope of the process according to the invention;

FIG. 4 Process details of a third variant of fractionation in the process according to the invention;

FIG. 5 Tabular representation of experimental results in the processing of mealybug larvae according to the method of the invention.

Figure 6:
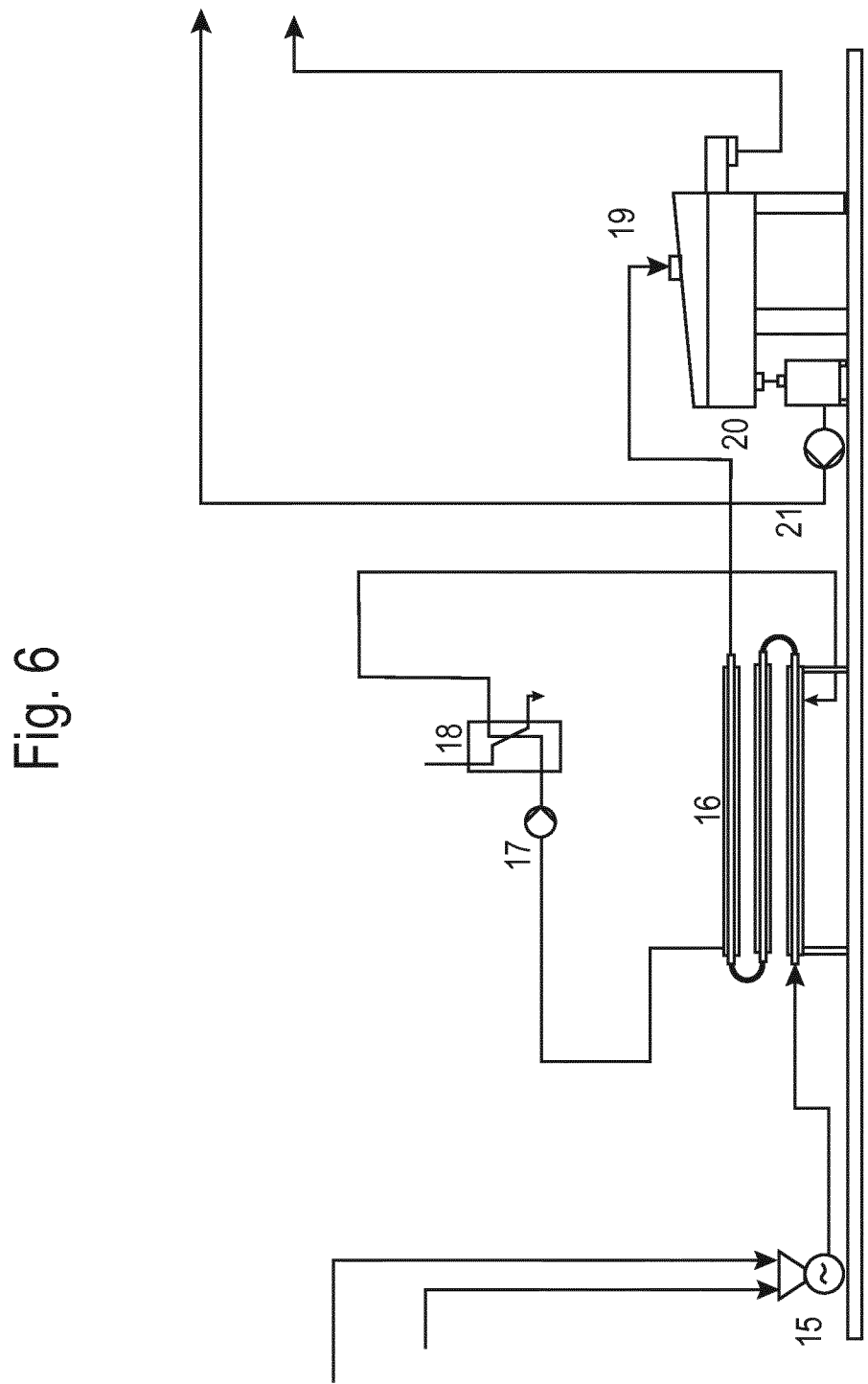

FIG. 6 Heat exchanger for killing insects

DETAILED DESCRIPTION

Insects, and particularly preferably insect larvae, are used as starting material for protein recovery. Insect larvae of Hermetia illucens (black soldier fly), Ceratitis capitata (Mediterranean fruit fly), and/or Tenebrio molitor (flour beetle) are particularly preferred. However, other insects and preferably their insects in the larval stage may also be considered.

In a first process step 1, the insect larvae are killed. The killing can be done by treatment in a hot water bath.

In a second process step 2, the insect larvae can optionally be cleaned. This can be done by sieving.

In a third process step 3, the insect larvae are comminuted to an insect pulp.

Here, the larvae are crushed (e.g., ground) to facilitate digestion by subsequent pH reduction. This can be done by means of a mill or press. The comminution can advantageously be performed to a mean particle size <2 mm, in particular to a mean particle size or grain size between 1 to 2 mm. A meat grinder can be used for this purpose, for example. Smaller particle sizes may allow better disintegration, but their production by, for example, rotating cutters can promote the formation of an emulsion by breaking up the oil components, which in turn worsens the separation.

In a fourth process step 4, the insect pulp is heated and stirred. In addition, the pH value is lowered.

The insect pulp resulting from the comminution can be stirred under heat for a period of time, preferably up to 3 hours, while being heated and/or kept at temperature. The preferred temperature in this step is 60-100° C. This process is also referred to as malaxation. The treatment of the insect pulp in this step can be carried out in a malaxeur.

Malaxation can preferably take place over a period of 60-130 minutes, particularly preferably 90-120 minutes, and is also preferably performed simultaneously with or immediately after acid addition.

Particularly preferably, the temperature during malaxation is in a range of 80-100° C., in particular below the boiling point of water, i.e., preferably 85-95° C. This preferably serves to terminate the enzyme activity and thereby prevent denaturation, since the pulpy substance obtained from insects otherwise quickly turns black on the surface.

The natural pH of insect larvae is typically in the slightly basic range. This is approximately pH=8.0 for the larva of the black soldier fly and pH=7.3 for the Mediterranean fruit fly larva.

According to the invention, the pH of the insect pulp is lowered to the acidic range at pH=1.5 to 6.5 after comminution by adding an acid.

This is done with the addition of an acid 200 and optionally with the addition of water 100.

The addition of water 100 to the insect pulp depends on whether the insect pulp contains sufficient liquid of its own. If this is not the case, additional dilution water must be added to the malaxeur and/or in a subsequent process step 5 of a fractionation by means of a centrifuge.

Sufficient liquid is present if free liquid is visible under the oil phase in the insect rinse, during a spin test in the laboratory centrifuge.

The acid addition starts immediately, i.e., preferably within less than 10 minutes, particularly preferably within less than 5 minutes, after the comminution in process step 3.

The acid addition can preferably be completed within less than 5 minutes.

Preferably, a strong inorganic acid can be used as acid. This acid can be added as a dilute acid in aqueous form, preferably as a 1 molar acid or in even higher dilution, in order to avoid selective over acidification of the insect pulp during acid addition and to avoid dissociation effects.

As acid, hydrochloric acid HCl is particularly preferred, preferably as HCl solution.

The preferred adjusted pH of the insect pulp after acid addition is pH=2 to pH=4.5. Particularly preferably, the adjusted pH of the insect pulp is between pH=2 to pH=3.

In a fifth process step 5, the insect pulp is fractionated. The fractionation of insect larvae can be carried out by a separating device of the centrifugal separation technique.

The acidified and optionally malaxed insect pulp can now be separated into at least two fractions by means of a centrifuge, in particular by a decanter centrifuge.

Preferably, the decanter centrifuge can be operated at at least 3500 G. This shows that lower residual oil values in the solids can be achieved by prior malaxation and the addition of acid than without lowering the pH value and/or without malaxation.

The use of a decanter is preferred and particularly suitable for separating the solid phase. A 3-phase decanter or a 2-phase decanter can be used for this purpose.

During or following fractionation 5, an alkali 300 may optionally be added to neutralize individual fractions, preferably the solid phase and/or the water phase.

Variations of the fractionation of process step 5 are shown in FIGS. 2-4.

In process step 5, according to FIG. 2, a single-stage fractionation 5-1, by dividing the insect pulp into several fractions, can be carried out in a 3-phase decanter.

In this process, the insect pulp is divided into a fat phase 600, a water phase 400 and a solid phase 500. The terms "phase" and "fraction" are to be understood synonymously in the context of the present invention.

In process step 5, according to FIG. 3, multi-stage fractionation 5-2 can be carried out in a 2-phase decanter as the first fractionation stage and a separator as the second fractionation stage.

The insect pulp is divided into a fatty aqueous phase 700 and a solid phase 500. The aqueous fat-containing phase 700 can then be separated in a separator into a water phase 400 and a fat phase 600.

Both the water phase 400 and the solid phase 500 may contain proteins of the insect larvae. The proteins may be present, for example, as protein curd suspended in the water of the water phase 400.

In process step 5, according to FIG. 4, a third fractionation 5-3 can also be carried out in multiple stages, also in a 2-phase decanter, followed by a subsequent treatment in an evaporator.

In this process, the insect pulp is divided into a fat phase 600 and a solids-containing aqueous phase 800. A protein-rich solid phase 500 can then be produced from the aqueous solids-containing phase 800 by drying 8.

The degreasing of the solid, can be influenced by the setting of the separator.

For this purpose, the fat content of the solid phase can optionally be measured and the speed and/or differential speed of the decanter can be adjusted if the fat content of the solid phase exceeds a predefined setpoint.

On the other hand, the way the insect pulp is made has an influence on the separation result.

Surprisingly, a shift in the pH of the insect pulp, shows a positive influence on the separation behavior, resulting in a particularly low residual fat content in the defatted solid (lower fat values).

Finally, in a sixth process step 6, the fractions can be further processed, e.g., by a drying step.

In FIG. 2, further processing 6 of the fat phase 600 is carried out by fat polishing 9. This can be done in a separator.

The water phase 400 may be subjected to drying 7, in particular in an evaporator.

The solid phase 500 obtained in the fractionation 5 according to FIGS. 2-4 can be dried by a drying step 8, preferably in a spray and/or disk dryer or in a dry mill, in particular a so-called ultra-red mill.

FIG. 5 shows a table of a test result as evidence of the surprisingly better separation efficiency for the separation of fat from the other fractions due to the pretreatment steps described above.

The results give the residual fat content (values related to dry substance) in the solid.

The parameters for the spin test shown in FIG. 5 were as follows

Acceleration=4800 g,

Spinning time=1 to 2 minutes,

Temperature of insect rinse and spinner more than 60° C., max. 95° C.,

Starting material: flour beetle larvae (crushed)

FIG. 5 shows the retention time in tabular form, which is the time during which the insect pulp remains in the malaxeur.

Furthermore, the pH value of the insect pulp in the centrifugal test is listed in tabular form.

A reduction of the residual fat content of more than 25% compared to an insect pulp from mealybug larvae without pH treatment and with only a shorter residence time in the malaxeur can be seen.

Tests have shown that the prior killing of insects in combination with solids separation leads to a significant reduction in the "browning effect", i.e., the brown discoloration after comminution.

This has been observed in particular with heating, especially boiling, e.g., in a hot water bath. Moreover, unlike e.g., freezing the insects, heating can be carried out in-line, i.e., without batch operation. This facilitates the procedural application and enables further automation of the processing procedure compared to freezing the insects.

Alternatively, heating can also be carried out by using a tubular heat exchanger, as shown in FIG. 6. In this case, the insects are conveyed through the tube heat exchanger together with water, heated therein and killed.

As variants of heating for the purpose of killing, starting from the feedstock of the live insects, processing in a continuous process or an in-line process is suitable. This is a particular advantage in the case of heating compared to a much more costly freezing process.

The temperature input prior to comminution deactivates the insect's own enzymes already at the beginning of the process, which prevents or significantly reduces the discoloration of the comminuted insect mass (browning). This is a significant advantage for the subsequent use of the solid fraction.

If a medium such as water is used, the insects or larvae are also washed in this step, which can result in an additional increase in product quality.

This is shown in FIG. 6. Here, water and live insects are fed by a pump 15 through a heat exchanger 16. The water can be already preheated water, which is further heated within the heat exchanger 16, e.g., a pipe heat exchanger. This results in the killing of insects by heating or boiling, analogous to a hot water bath.

The temperature of the water in which the insects are guided during killing is preferably more than 60° C., preferably 75-100° C.

The residence time in the heat exchanger until complete killing depends on the flow rate of the insects, the water temperature reached and the capacity of the heat exchanger. The time can be determined by calculation or by tests.

The killed uncrushed insects are then separated from the aqueous solution. This can preferably be done by sieving. In FIG. 6, a sieving device in the form of a vibrating sieve 19 is provided for this purpose.

A collection tank 20 is arranged below the screening device 19, and the liquid can be discharged from the collection tank by a pump 21 via a drain.

The heat exchanger 16 has a circuit for supplying a heat medium, e.g., hot water, with which the water/insect mixture in the heat exchanger can be indirectly heated. This circuit has at least one pump 17 and a second heat exchanger 18, which can be operated, for example, with superheated steam. The killed uncrushed insects leave the screening device 19 and can be fed to a crushing device, e.g., a chopper, a press or a mill.

The entire process, including killing, can be carried out in continuous process control so that side reactions of the biological product are largely prevented or at least reduced.

The end product thus has fewer impurities and does not have to be cleaned up at great expense.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE SIGN

Process step 1 Killing
Process step 2 Cleaning
Process step 3 Shredding
Process step 4 Malaxation
Process step 5 Fractionation
5-1 first fractionation variant
5-2 second fractionation variant
5-3 Third fractionation variant
6 Further processing
7 Drying
8 Drying
9 Fat polishing
15 Pump
16 Heat exchanger
17 Pump
18 second heat exchanger
19 Vibrating screen
20 Collector tank
21 Pump
100 Water
200 Acid
300 Lye
400 Water phase
500 Solid phase
600 Fat phase
700 aqueous fatty phase
800 aqueous phase containing solids

The invention claimed is:

1. A method for obtaining products of the food industry and/or feed industry from insects in a larval stage, the method comprising:
   a) killing the insects by heating the insects, mixed with water prior to crushing the insects, and wherein a temperature of the water in which the insects are carried is greater than 60° C. during killing, and wherein killed insects are separated from the water prior to crushing the killed insects;
   b) comminuting the killed insects to form an insect pulp;
   c) shifting a pH-value of the insect pulp to an acidic range by adding an acid and malaxing the insect pulp for at least 45 minutes; and
   d) fractioning the insect pulp by centrifugal processing into at least two fractions, which include i) a solid phase and ii) a fatty phase,
   wherein the no additional enzymes are employed during the method.

2. The method of claim 1, wherein the fractioning of the insect pulp is carried out in several stages.

3. The method of claim 1, further comprising: drying the solid phase.

4. The method of claim 1, wherein the addition of acid occurs within less than 5 minutes after the comminution.

5. The method of claim 1, wherein the pH-value of the insect pulp after the addition of the acid is less than pH=6.5.

6. The method of claim 1, wherein a temperature during malaxing or fractioning is at least 60° C.

7. The method of claim 1, wherein the malaxing is performed for a period of 90-120 minutes.

8. The method of claim 1, further comprising:
   processing the fatty phase obtained by fractioning using fat polishing.

9. The method of claim 1, wherein an average particle size of insect parts in the insect pulp after the comminuting is between 1 and 2 mm.

10. The method of claim 1, wherein the comminuting is carried out by shearing the insects in a meat grinder.

11. The method of claim 1, wherein the acid is a diluted hydrochloric acid with a concentration of 0.001 mol/L to 0.5 mol/L.

12. The method of claim 1, wherein after the fractioning the method further comprises:
   neutralizing at least one of the solid and fatty phases by adding a diluted NaOH solution.

13. The method of claim 1, wherein after the killing of the insects and before the comminuting the insects, the insects are surface washed.

14. The method of claim 1, wherein water is added during the malaxing or the fractioning.

15. The method of claim 1, wherein the fractioning is carried out in a 3-phase decanter, a 2-phase decanter and a separator, or a 2-phase decanter.

16. The method of claim 1, wherein the uncrushed insects are suspended in water to kill the uncrushed insects.

17. The method of claim 1, wherein the killing is performed in a heat exchanger.

18. The method of claim 1, wherein, during the killing of the uncrushed insects, the temperature of the water containing the uncrushed insects is 75-100° C.

19. The method of claim 1, wherein the separation of the water after the killing of the uncrushed insects is performed by screening.

* * * * *